(12) United States Patent
Haltmayer et al.

(10) Patent No.: US 8,141,914 B2
(45) Date of Patent: Mar. 27, 2012

(54) WATER-CONDUCTING HOUSEHOLD APPLIANCE, IN PARTICULAR A DISHWASHER OR WASHING MACHINE

(75) Inventors: Werner Haltmayer, Dinkelsbühl (DE); Mathias Herrmann, Nattheim (DE); Stefan Kasbauer, Dillingen (DE); Claus Köther, Niederstotzingen (DE); Martin Weissenburger, Bissingen (DE)

(73) Assignee: BSH Bosch und Siemens Hausgeraete GmbH, Munich (DE)

( * ) Notice: Subject to any disclaimer, the term of this patent is extended or adjusted under 35 U.S.C. 154(b) by 209 days.

(21) Appl. No.: 12/381,882

(22) Filed: Mar. 17, 2009

(65) Prior Publication Data

US 2009/0267342 A1    Oct. 29, 2009

(30) Foreign Application Priority Data

Apr. 25, 2008  (DE) .......................... 10 2008 020 886

(51) Int. Cl.
*F16L 37/00* (2006.01)
(52) U.S. Cl. ...................... 285/305; 285/403; 29/525.01
(58) Field of Classification Search .................. 285/305, 285/403, 374, 903
See application file for complete search history.

(56) References Cited

U.S. PATENT DOCUMENTS

| | | | | | |
|---|---|---|---|---|---|
| 3,479,069 | A | * | 11/1969 | Sedam | 285/403 |
| 3,945,669 | A | * | 3/1976 | Bochory | 285/305 |
| 4,332,402 | A | * | 6/1982 | Shellhause | 285/374 |
| 5,167,213 | A | * | 12/1992 | Bassler et al. | 285/305 |
| 5,219,188 | A | * | 6/1993 | Abe et al. | 285/319 |
| 5,609,370 | A | * | 3/1997 | Szabo et al. | 285/319 |
| 5,921,112 | A | * | 7/1999 | Boved | 137/387 |
| 6,382,343 | B1 | * | 5/2002 | Engler | 285/305 |
| 6,539,920 | B1 | * | 4/2003 | Spiers | 285/305 |
| 6,851,725 | B2 | * | 2/2005 | Lutzke | 285/305 |
| 7,178,837 | B2 | * | 2/2007 | Yoshino | 285/305 |
| 7,322,617 | B2 | * | 1/2008 | Paquis | 285/259 |
| 7,799,015 | B2 | * | 9/2010 | Schweikert | 285/305 |
| 7,810,848 | B2 | * | 10/2010 | Yoshino | 285/305 |
| 7,837,234 | B2 | * | 11/2010 | Yoshino et al. | 285/305 |

FOREIGN PATENT DOCUMENTS

DE    202005019175 U1    6/2006

* cited by examiner

*Primary Examiner* — David E Bochna
(74) *Attorney, Agent, or Firm* — James E. Howard; Andre Pallapies

(57) ABSTRACT

A water-conducting household appliance includes a water-conducting line having a line end which is connected in a connecting position to a connecting piece, and a securing element which attaches onto the line end and the connecting piece and holds the line end in the connecting position.

21 Claims, 7 Drawing Sheets

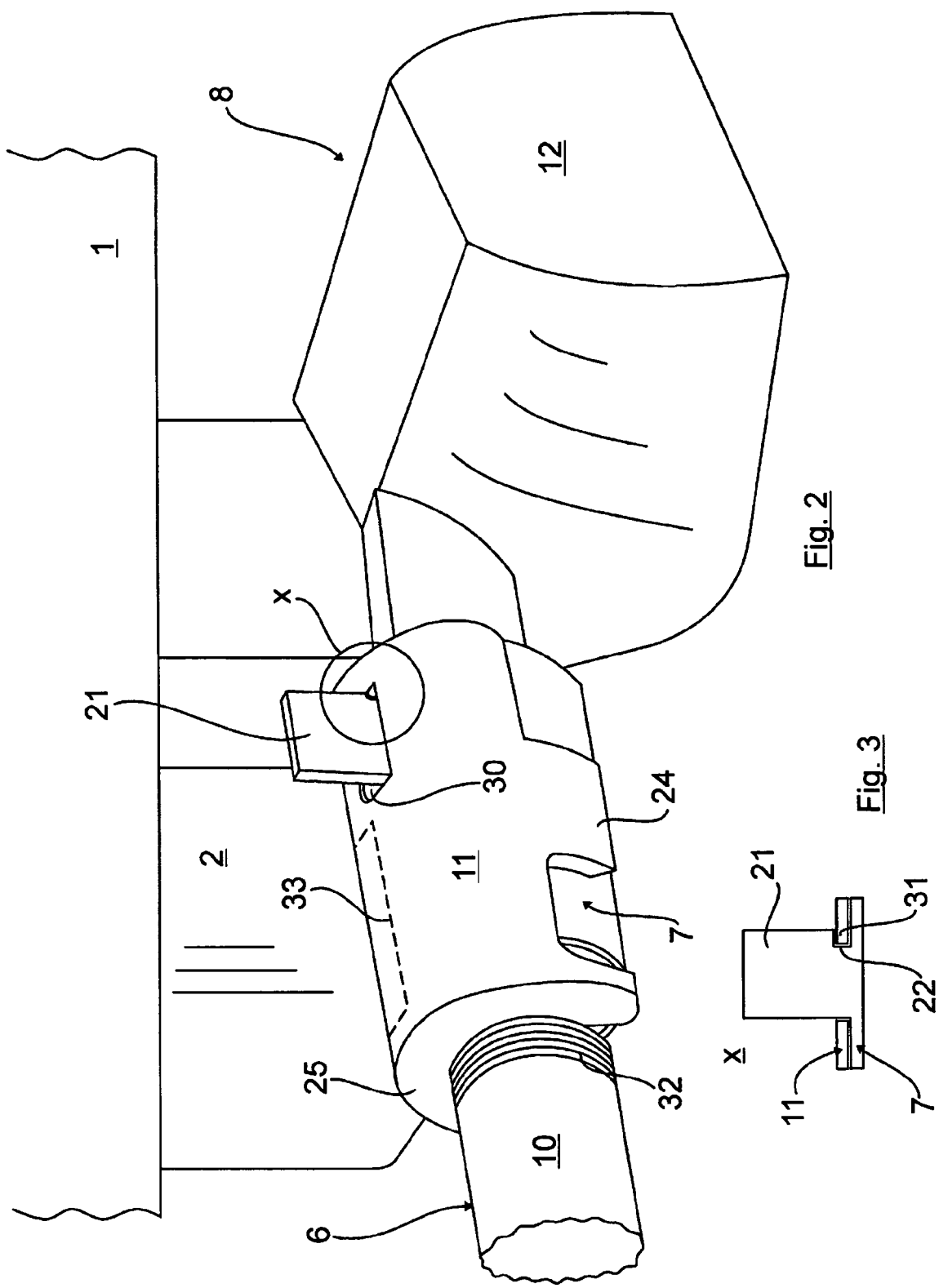

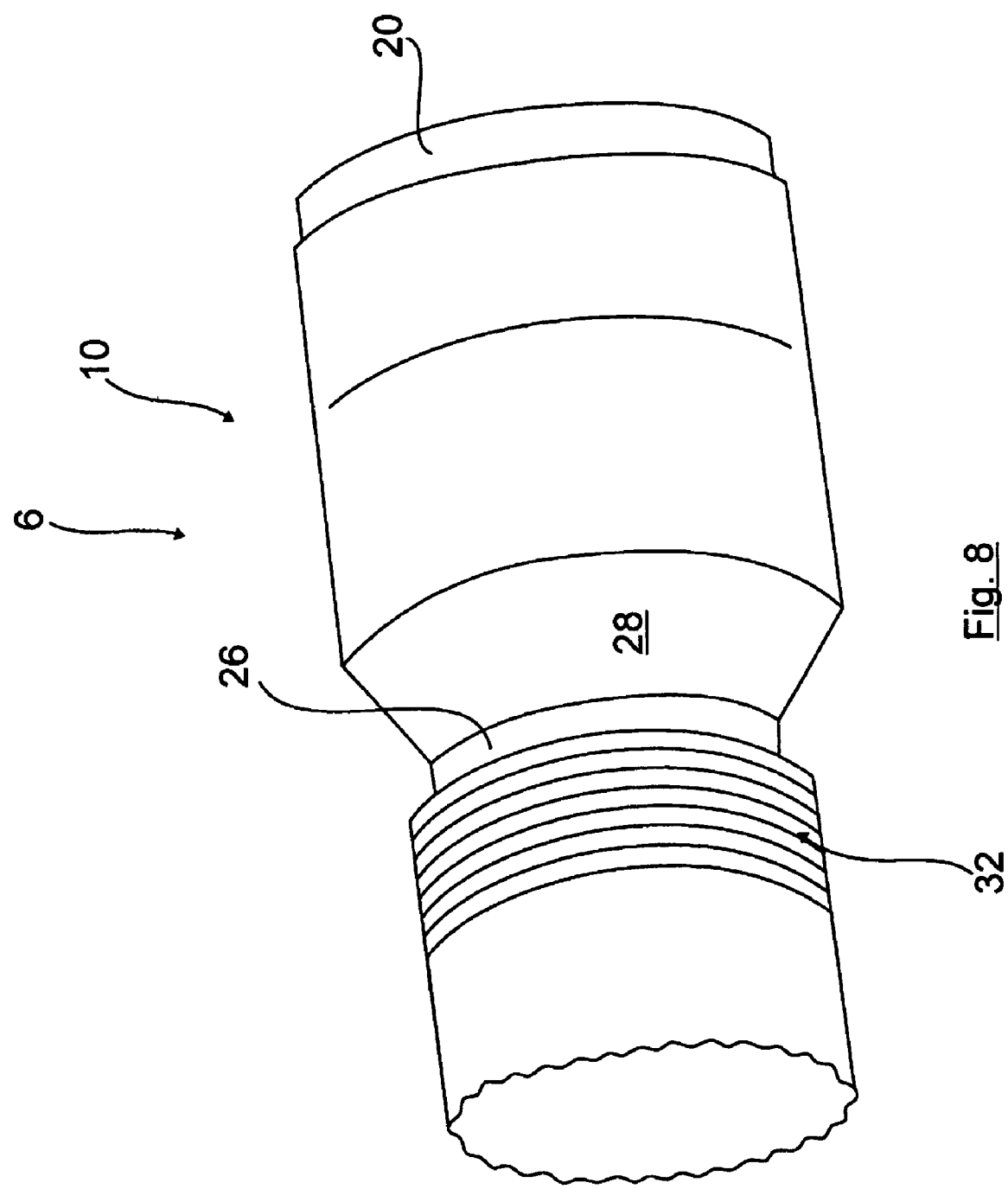

WATER-CONDUCTING HOUSEHOLD APPLIANCE, IN PARTICULAR A DISHWASHER OR WASHING MACHINE

BACKGROUND OF THE INVENTION

The invention relates to a water-conducting household appliance, in particular a dishwasher or washing machine, a securing element, and a method for fitting a securing element. In water-conducting household appliances such as, for example, dishwashers, appliance assemblies such as e.g. heat exchanger, drain pump, pump sump or washing container are connected to one another via water-conducting lines. For example, dishwashers have a pump discharge hose, via which the washing water is pumped out of the appliance. This pump discharge hose is routinely connected to a so-called pump sump and sealed by means of e.g. O rings. In order that, after being fitted, this pump discharge hose remains in its predetermined, defined position under an operating load, in particular a pumping load, this hose is secured against being pulled out by means of hose-securing devices in order to prevent seals from being broken and leakages. It is generally known for a hose-securing device of this kind to be realized in a U-shaped bracket integrated into the base tub. However, this type of hose-securing device cannot, particularly in conjunction with platform manufacture, be deployed universally for all dishwasher types, thereby restricting flexibility with regard to the use of such a hose-securing device, in particular in serial production. Furthermore, problems of association can arise with such a hose-securing device integrated into the base tub of a dishwasher in relation to components subject to tolerance restraints.

SUMMARY OF THE INVENTION

In the light of this, an object of the present invention is to provide a water-conducting household appliance, in particular a dishwasher, a securing element and a method for fitting a securing element, by means of which the connection of a water-conducting line, in particular a pump discharge hose, to a connecting piece can be carried out in a simplified and universally applicable manner with a high degree of functional reliability. The invention is based on a water-conducting household appliance, in particular a dishwasher or washing machine, having a water-conducting line, the line end of which is, in a connecting position, connected to a connecting piece, characterized in that a securing element is provided, which attaches onto the line end and onto the connecting piece and holds the line end in the connecting position.

The water-conducting household appliance has a securing element which attaches onto the line end and onto the connecting piece and holds the line end in the connecting position. The securing element for securing the water-conducting lines is thereby displaced immediately and directly to the components to be connected to one another, e.g. in an exemplary embodiment of the present invention to a connecting piece on the pump sump side and to a pump discharge hose. Such a securing element, which is displaced directly to the components to be connected to one another, enables an advantageous cross-platform application and use, irrespective of e.g. different tub designs. By means of the direct design of the securing element for the components to be connected to one another, manufacturing-related tolerances can also be compensated for more easily and more readily.

An examplary embodiment of the securing element provides that this securing element is connected to the line end and/or to the connecting piece by means of a releasable locking connection. Such a releasable locking connection enables easy fitting and also dismantling of the securing element. In addition, an easy-to-manufacture and functionally reliable connection of the line end to a connecting piece can be provided in this way.

The securing element is furthermore embodied as one piece and/or of a uniform material, e.g. of a plastic material. Simple, cost-effective and automated manufacture of a securing element according to the invention is thereby possible. Furthermore, a securing element which can be clipped on elastically can be manufactured particularly easily using a plastic material.

In principle, there are various options for connecting the line end to the connecting piece, for example such that the line end is pushed over the connecting piece. In connection with the securing element according to the invention, however, in an embodiment the line end is fitted or inserted for a predetermined insertion length into the mouth region of the connecting piece. The connection of the line end to the connecting piece is effected in particular using at least one sealing element, e.g. an O-ring, by means of which the sealing of the connection can be produced in a simple manner. For a secure positioning of the line end in the connecting piece the free line end is supported against an abutment embodied in the connecting piece. Such an abutment can be embodied e.g. by a web or annular collar embodied in the interior of the connecting-piece region. Alternatively, however, the abutment can also be formed by a valve element, e.g. a valve element embodied as a non-return valve, by means of which, e.g. in conjunction with a pump discharge hose, the return flow of the pumped-out washing water into the pump sump can reliably be prevented.

For a particularly functionally reliable connection of the line end to the connecting piece, the invention provides that the securing element embraces the connecting piece and/or the line end in a predetermined region in a substantially form-locking manner and thereby lies against an outer circumferential surface of the connecting piece and/or of the line end in a contact connection. In an exemplary embodiment, the line end and/or the connecting piece has for this purpose a cylindrical, in particular a perfectly cylindrical external circumferential contour, at least in the contact region of the securing element.

An exemplary embodiment, provides in this regard that the securing element be embodied as a half shell and/or as a securing bracket which can preferably be clipped on elastically, which embraces the line end and/or the connecting piece in the predetermined region at least partially. Such a half shell can be manufactured particularly easily, e.g. as a molded plastic part. A securing element embodied as a securing bracket which can be clipped on elastically has the advantage that it can be fitted during production in a fast, simple and functionally reliable manner. The at least partial embrace also ensures in a simple manner that the securing element or the securing bracket snaps on to the line end and/or the connecting piece and fixes these in place reliably. To snap on in such a manner, the securing element or the securing bracket is preferably embodied such that it has an embracing angle of greater than 180°. Embracing angles may lie in the range of greater than 200°, in particular in the range from 200° to 300°. In this range of embracing angles, easy fitting without excessive exertion of force by the worker and, on the other hand, adequately secure fitting of the securing element on the connecting piece and/or the line end are ensured.

According to an exemplary embodiment, the securing bracket embodied as a half shell has, on a shell base body or half-shell region associated with the preferably cylindrical connecting piece, finger-like or projection-like, elastically clamping webs, spaced at a distance from one another in a transverse direction, preferably in a radial direction, which clamping webs form the embracing angle range, which preferably exceeds 180°.

A locking element is provided on the connecting piece and/or on the line end, which locking element, working in conjunction with a mating locking element on the securing-element side, locks the connecting piece and/or the line end, preferably under prestress, to the securing element. By means of such a locking connection, in particular a prestressed locking connection, a particularly high-quality and functionally reliable connection of line end and connecting piece is achieved. Alternatively or additionally, however, the locking element can, working in conjunction with a mating locking element on the securing-element side, also prevent a displacement of the securing element relative to the connecting piece and/or to the line end. This simultaneously also provides in connection with the securing element an anti-rotation element. Furthermore, it can alternatively or additionally be provided in the cooperation of locking element and mating locking element that the line end be pulled into a preferably prestressed seal seat with the connecting piece. A particularly high-quality sealing of the connection of line end and connecting piece can thereby be provided. All in all, by means of some or all of these measures a particularly high-quality, easy-to-manufacture and reliable means of preventing a connecting piece-line connection from being pulled out is consequently provided.

Specifically in this regard, on the connecting piece a locking rib can be embodied, projecting away from this connecting piece in a projection-like or blade-like manner, which locking rib extends through a locking opening on the securing-element side such that a locking element on the opening-edge side locks with a mating locking element on the locking-rib side, preferably under prestress in the direction of the locked position, in particular locks an opening edge of the locking opening, which opening edge forms the locking element with a recess on the locking-rib side, e.g. under prestress in the direction of the locked position.

The prestress can in principle be produced by any suitable force accumulator acting in the direction of the seal seat and/or locked position, e.g. also a spring element or the like. In an exemplary embodiment, however, the force accumulator is formed by an elastic line region of the water-conducting line, preferably by a hose line embodied with a wave profile, which works in conjunction with the securing element such that the line region, in the fitting of the securing element, is displaced or compressed, e.g. in connection with an abutment on the connecting-piece side, building up a prestress. After the securing element has been fitted, the prestress is then at least partially relaxed such that the line end is pulled into the seal seat on the connecting piece and/or the mating locking element on the securing-element side locks securely with the locking element on the connecting-piece and/or line-end side. The prestress is thus applied here in an advantageous and functionally integrated manner by the components which are already present. Alternatively or additionally, the prestress can, however, optionally also be formed by an elastic seal, e.g. an O-ring, between line end and an abutment associated with this line end, e.g. a valve element, and/or an elastically resiliently embodied valve element, for which purpose the housing of the valve element has e.g. slotted recesses, wave profile sections or such like providing a spring effect.

To support the connection, the gap between a locking element on the connecting-piece side and a locking element on the line-end side can additionally be predetermined such that, when the securing element is fitted and mating locking elements on the securing-element side are correspondingly locked with the locking elements, due for example to the application of a force to the line end, a prestressing force is produced which forces the hose end in the direction of the connecting piece and thus preferably pulls it into its seal seat and/or locks the securing element with the connecting piece or the line end. The application of force to the line end is effected here preferably by means of the line end being supported against an abutment on the connecting-piece side, as described previously.

According to a further exemplary embodiment of the securing element according to the invention, in particular in connection with a line end inserted into a connecting piece, the invention provides that this securing element be furnished, in a region of the securing element associated with the line end, with a locking element, which in turn works in conjunction with a mating locking element on the line-end side. Such a locking connection is easy to manufacture and fit and also has high functional reliability. An exemplary embodiment specifically provides that at least one projection-like locking web or locking collar on the securing-element side lock in a substantially force-locking and/or form-locking manner with or in a locking groove on the line-end side and/or at least partially embrace the latter. This locking collar may have a bevel such that a kind of lead-in chamfer is embodied, on the basis of which the securing element can be clipped easily and quickly with the desired fixing and clamping effect on the region of the line which has the locking groove. Particularly where the water-conducting line is a flexible hose, this clipping of the securing element on to the line end can also be accomplished easily and quickly by virtue of the fact that the hose can in certain limits be compressed and reversibly deformed in order to provide in a functionally reliable manner the embracing or engaging of the line end by the corresponding locking element on the securing-element side.

A simple insertion of the hose end into the connecting piece can be achieved by virtue of the connecting piece having in the immediate mouth region a bevel as a lead-in chamfer and/or the line end having e.g. a diameter reduction or likewise a chamfer.

As already explained previously, the water-conducting line is preferably a flexible hose line, in particular a hose line embodied with a wave profile. In this connection, it should be stated explicitly that the term 'water-conducting' in the present invention is to be understood in a broader sense and, of course, covers equally all the media or liquids of a household appliance which are to be supplied or discharged, e.g. washing water which is pumped out of the dishwasher.

According to an exemplary embodiment, the water-conducting line is a pump discharge hose which is connected to a connecting piece of a pump sump which can be connected to a pump. With a pump discharge hose of this type, relatively high tractive force loads occur during operation, which the securing element according to the invention reliably counteracts and holds the hose end of the pump discharge hose in the connecting piece of the pump sump.

BRIEF DESCRIPTION OF THE DRAWINGS

Exemplary embodiments of the invention will be explained with the aid of drawings, in which:

FIG. 2 shows schematically a perspective detailed representation of a securing element according to an exemplary embodiment of the invention fitted on a connecting piece on the pump sump side;

FIG. 3 shows a schematic detailed representation of the detail X from FIG. 2;

FIG. 8 shows schematically and perspectively the hose end of the pump discharge hose shown in FIGS. 1 to 6.

DETAILED DESCRIPTION OF EXEMPLARY EMBODIMENTS OF THE PRESENT INVENTION

Figure 1:
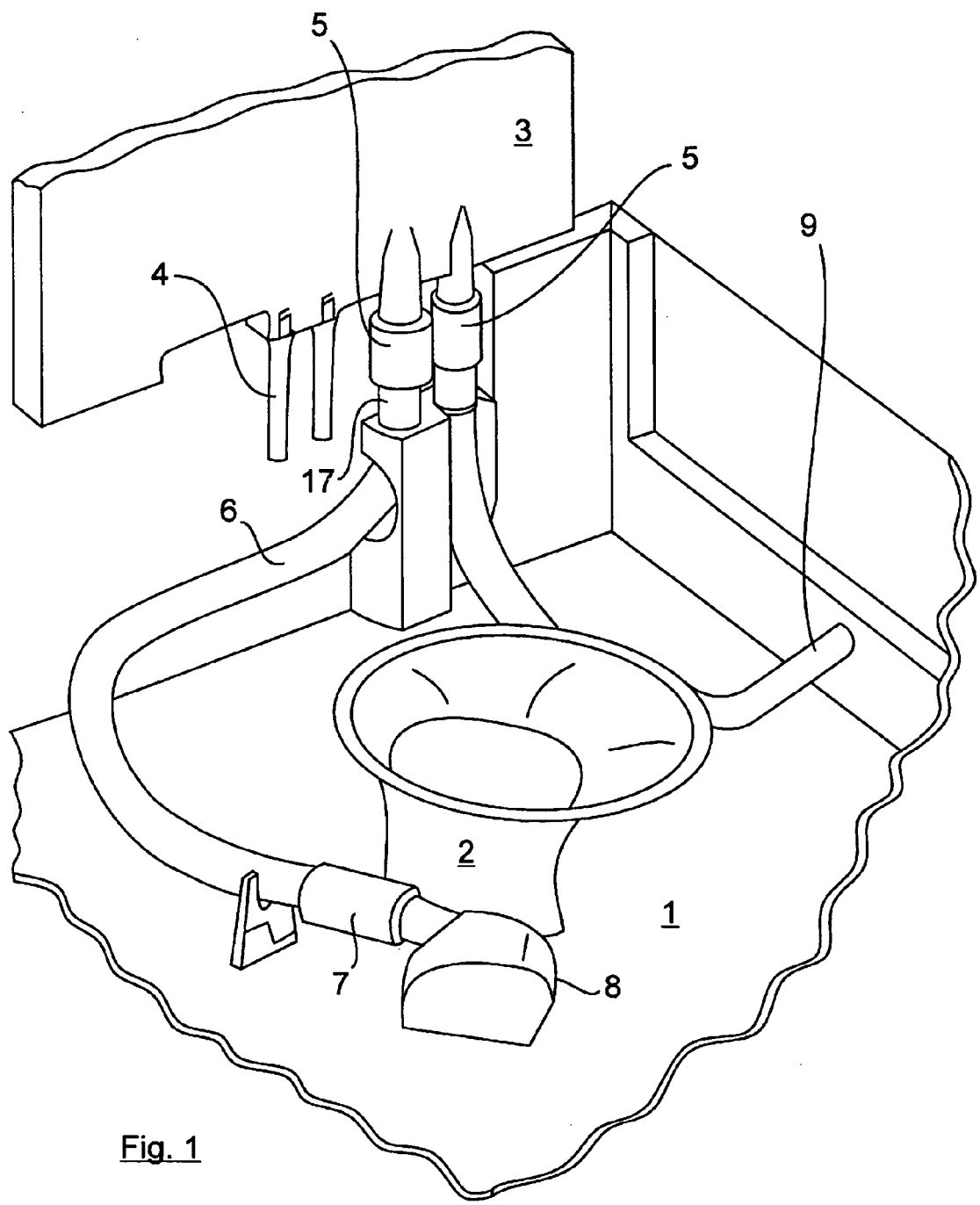
FIG. 1 shows in a perspective partial view a schematic representation of a mounting base of a dishwasher with a pump sump.

FIG. 1 shows schematically in a perspective partial representation a mounting base 1 of a dishwasher in a pre-fitted state. The mounting base 1 of the dishwasher is manufactured e.g. as a plastic injection-molded part. According to FIG. 1, a drain pump 8 with associated pump sump or pump well 2 is mounted on the mounting base 1. Also shown is a water tank serving as a heat exchanger 3, which is in thermoconductive contact with a washing container (not shown).

The heat exchanger 3 has connecting pieces 4 to which hose lines, which are not shown, can be connected. In addition, the plate-shaped heat exchanger 3 has two end pieces 5 protruding vertically downwards, which are flow-connected on the one hand via a flexible pump discharge hose 6 to a connecting piece 7 on the pump sump side and thereby to the pump sump 2 and the drain pump 8 and on the other via a flexible hose line 9 to the water supply network.

FIG. 2 now shows in detail the connection of a hose end 10 of the pump discharge hose 6 to the connecting piece 7 on the pump sump side by means of a securing element embodied here by way of example as a hose-securing bracket 11. As can be seen in particular also from the schematic sectional representation in FIG. 4, the connecting piece 7 on the pump sump side here is an integral part of a pump sump 2 or of a pump housing 12, which is likewise connected to the pump sump 2 and accommodates a pump mechanism, which is not shown here and by means of which washing water is pumped out of the pump sump 2 via the discharge opening 13 on the pump sump side in the direction of the connecting piece 7 on the pump sump side and then further to the pump discharge hose 6.

In order to prevent the washing water from flowing back again into the region of the pump sump 2, a non-return valve 14, represented here only highly schematically, is arranged in the connecting piece 7, which non-return valve comprises, for example, a flap valve 15, represented here only schematically and by dashed lines. This non-return valve 14 simultaneously forms with an end region facing the hose end 10 an abutment 16 on the connecting-piece side, against which the hose end 10 is supported with its front side. As can be seen from FIG. 4, the hose end 10 in the connecting piece 7 is substantially received in a form-locking manner, a sealing element in the form of an O-ring 17, shown here only schematically and by way of example, being inserted between the internal wall of the connecting piece and the external circumferential region of the hose end 10. For this purpose, a corresponding annular groove 18 is embodied in the region of the hose end 10 as an O-ring seat.

Figure 7:
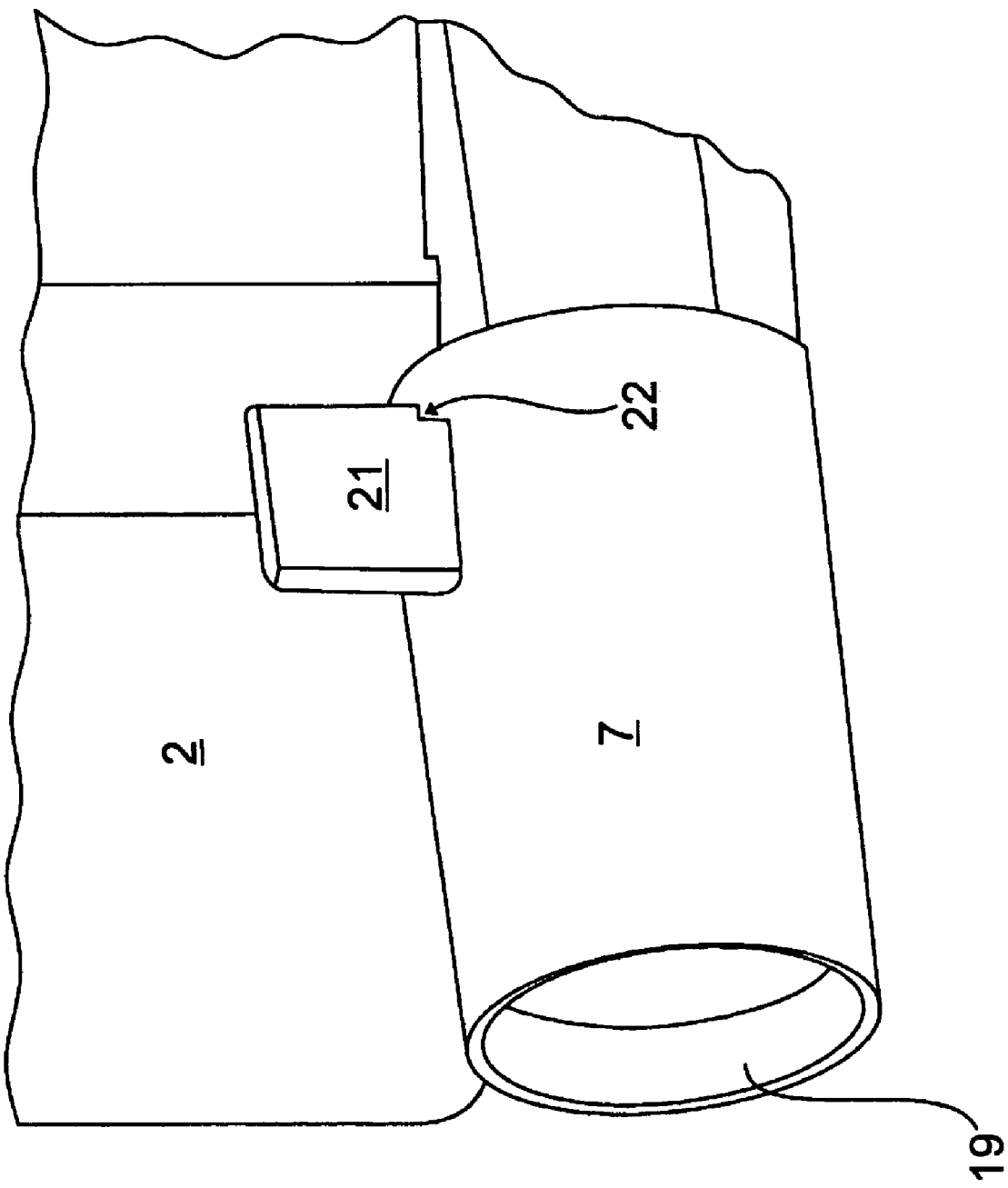
FIG. 7 shows schematically and perspectively the mouth region of the connecting piece together with a bevel as lead-in chamfer.

As can be seen in particular also from FIGS. 7 and 8, the connecting piece 7 can have at the mouth end a bevel 19 as a lead-in chamfer, in the same way that the hose end 10 can have on the face end a diameter reduction in the form of a stepped gradation 20, which facilitate the threading of the hose end 10 into the connecting piece 7 and the stopping against the abutment 16 and thus the correct positioning of the hose end 10 in the connecting piece 7.

Figure 5:
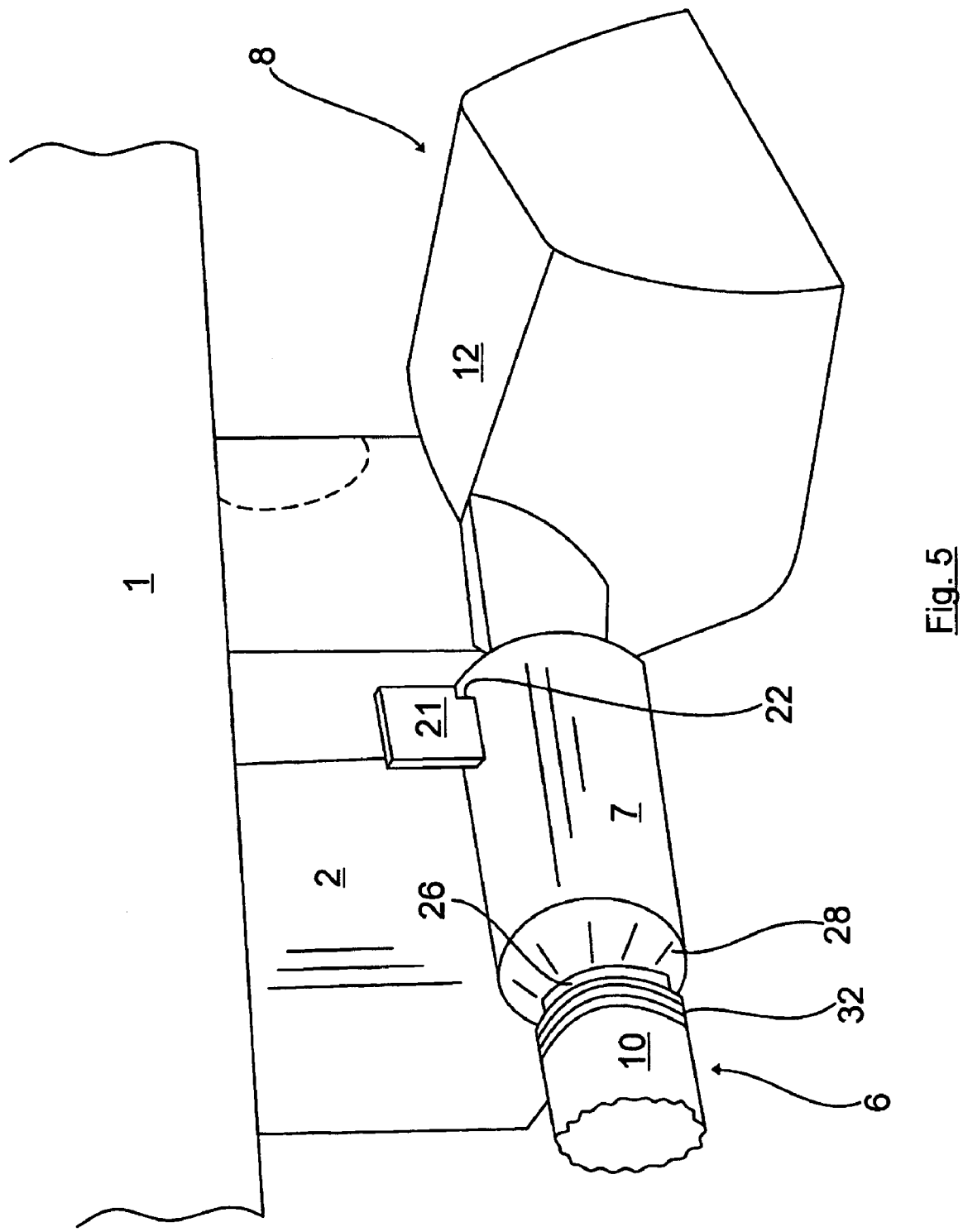
FIG. 5 shows a schematic, perspective representation as per FIG. 2 without the securing element according to an exemplary embodiment of the invention.

As can further be seen from FIG. 5, which shows the hose end 10, in the fitted state, in the connecting piece 7, the connecting piece 7 has on its external circumferential region a locking rib 21 which protrudes blade-like from the connecting piece 7. On the side facing away from the hose end 10, this locking rib 21 has, in the lower end region facing the connecting piece 7, a locking recess 22, whose way of functioning together with the locking rib 21 will be explained in detail below in connection with the fitting of the hose-securing bracket 11.

Figure 4:
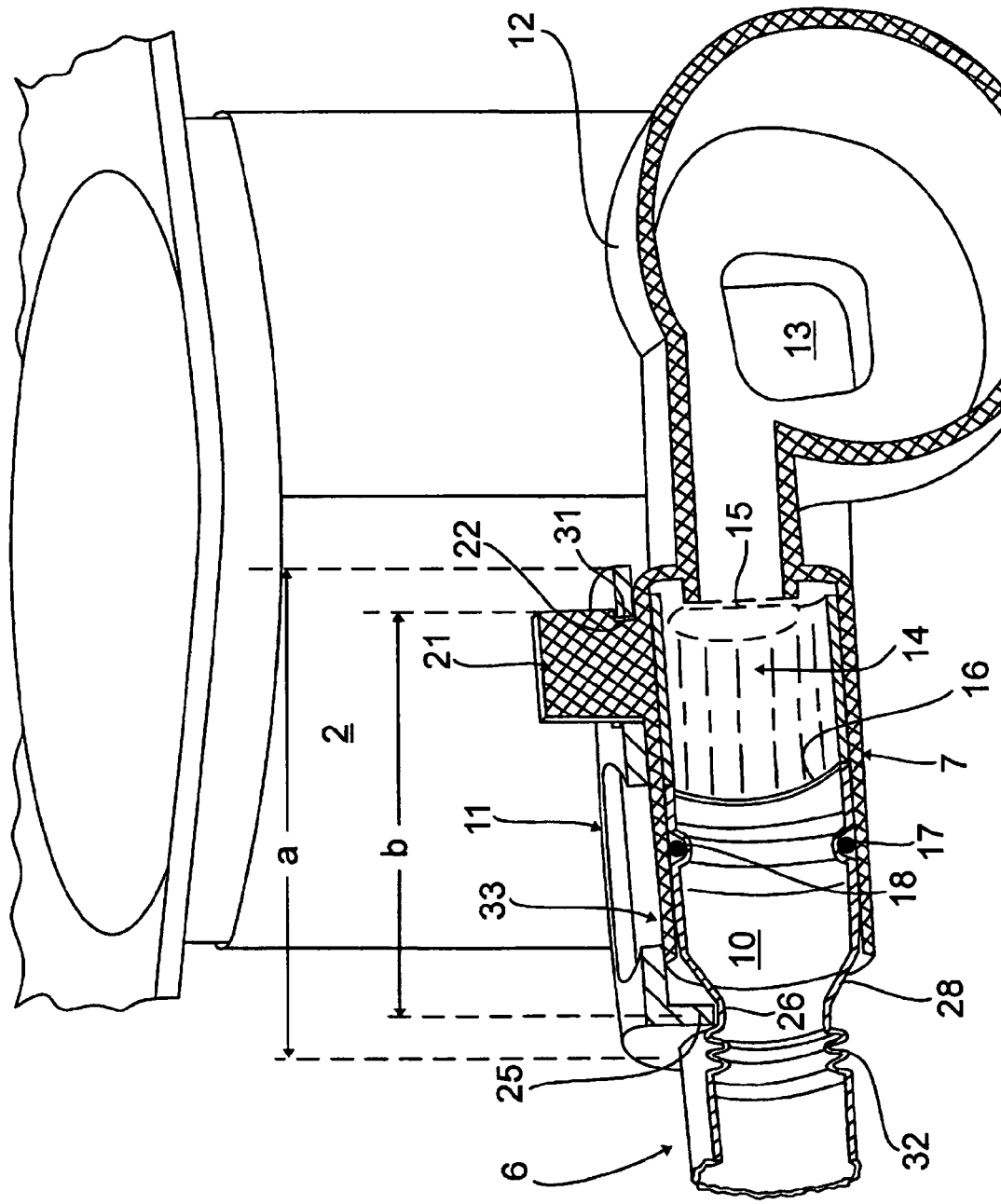
FIG. 4 shows a schematic cross section through the connecting piece/pump discharge hose connection according to FIG. 2.

This hose-securing bracket 11 has a half-shell-like structure with a shell base body 23 which, in the fitted state shown in FIG. 1 and in FIG. 4, attaches onto both the hose end 10 and the connecting piece 7 such that the hose end 10 is held and fixed on the connecting piece 7 in the connecting position. This is achieved respectively by means of a releasable locking connection, the hose-securing bracket 11, in the clipped-on state, embracing the connecting piece 7 along a predetermined longitudinal region a in a substantially form-locking manner and lying with the shell base body 23 in a contact connection on the external circumferential region of the connecting piece 7. Projection-like clamping webs 24, spaced at a distance from one another, are affixed to the shell base body 23 in a half-shell region associated with the connecting piece 7 in a radial direction, which clamping webs form an engaging or embracing angle range which exceeds 180° and consequently hold the hose-securing bracket 11 in the clipped-on state with a predetermined holding force to the connecting piece 7.

An approximately U-shaped annular collar 25 is embodied on the end of the shell base body 23 associated with the hose end 10, which annular collar, in the fitted state, is locked in a form-locking manner with a locking groove 26 on the hose-end side and embraces this locking groove likewise in an embracing angle range of greater than 180°. The annular collar 25 has lead-in chamfers 27 which facilitate the clipping on of the annular collar 25 on the hose-securing bracket side onto the hose end 10. By means of this embracing, on the annular-collar side, of the hose end 10, the hose end 10 is securely fixed and locked and held with a predetermined holding force to the hose-securing bracket 11.

Adjoining the region of the locking groove 26 in the direction of the connecting piece 7 is an inclined surface as a conical region 28 which assists e.g. the process of attaching the annular collar 25 in the region of the locking groove 26.

Figure 6:
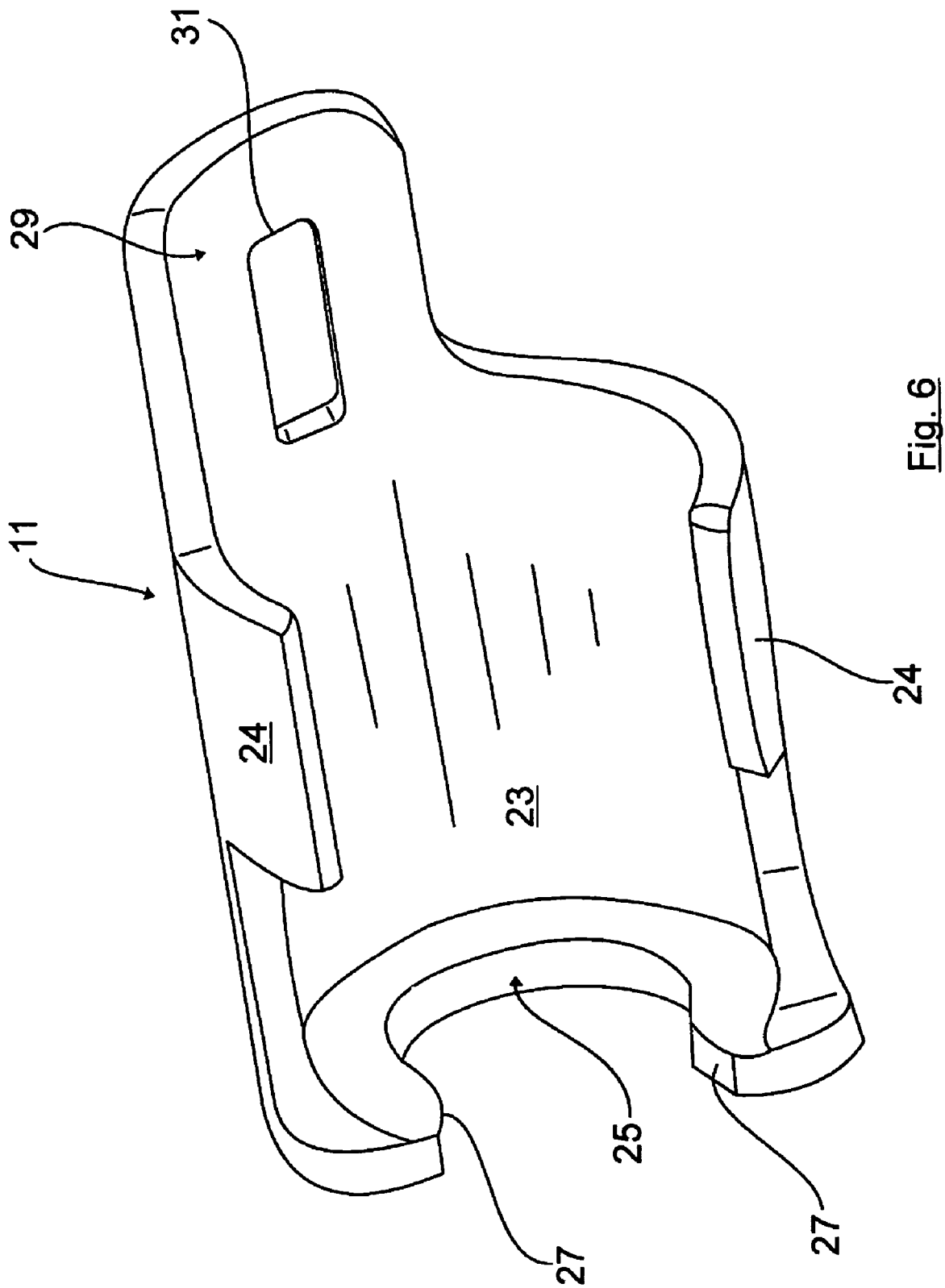
FIG. 6 shows schematically an enlarged perspective bottom view of the securing element according to an exemplary embodiment of the invention.

As can further be seen in particular from FIG. 6 and FIG. 4, the hose-securing bracket 11 has, in the region of the shell base body 23, on the side facing away from the annular collar 25, an extension 29, in which a locking opening 30 is embodied such that this locking opening, when the hose-securing bracket 11 is in the fitted state, encompasses or surrounds the locking rib 21 in a substantially form-locking manner. This locking opening 30 or, in the fitted state, its opening edge 31 associated with the locking recess 22, as is shown in FIG. 4 and in FIG. 2, is assigned in this fitted state the function of a mating locking element on the hose-securing-bracket side, which mating locking element, when the hose-securing bracket 11 is in the fitted state, locks or snaps into the locking recess 22 and assists a secure fixing of the hose-securing bracket 11 to the connecting piece 7, in particular hindering or preventing an unwanted or unintended lifting of the hose-securing bracket 11 from the connecting piece 7. In order to ensure that the opening edge 31 snaps into the locking recess 22 of the locking rib 21 in a permanently functionally reliable manner, the gap b between the annular collar 25 or the locking groove 26 on the one hand and the opening edge 31 or the locking recess 22 is predetermined such that, when the hose-securing bracket 11 is fitted, the hose end 10 is pressed with such a force in the direction of the abutment 16 and supported there that the hose end 10 simultaneously exerts, via the annular collar/locking groove connection, a force directed away from the connecting piece 7 onto the hose-securing bracket 11, such that the hose-securing bracket 11 locks, effectively under prestress, with the opening edge 31 into the locking recess 22. This prestress can be achieved very well in connection with a pump discharge hose 6 made of a plastic material, which hose has at least in some regions a wave profile 32, as for reasons of clarity is shown here only in a partial region. For example, a wave profile of this type can also be provided in the hose region received in the connecting piece 7 in the region between the conical region 28 and the O-ring 17. In principle, however, this flexibility and thus prestress can also be predetermined on the basis of the material properties of a plastic hose with thin wall dimensions. A prestress is also possible by means of an appropriate arrangement of the sealing elements, e.g. the O-rings, or by means of a spring element or by means of a resilient valve support.

However, besides the locking of the opening edge 31 in the locking recess 22, this prestress simultaneously also causes the hose end 10 in the connecting piece 7 to be pulled in the direction of the seal seat, as a result of which a particularly advantageous seal seat is produced.

The hose-securing bracket 11 is manufactured from a plastic material, it being possible for this hose-securing bracket, as shown only by dashed lines in FIG. 2 and in the partial section in FIG. 4, to have material notches 33, thereby not only saving material but also at the same time assisting the elasticity of the hose-securing bracket 11 and thus making it easier for it to be clipped onto the connecting piece/pump discharge hose connection.

The invention claimed is:

1. A water-conducting household appliance comprising:
    a water-conducting line having a line end which is connected in a connecting position to a connecting piece; and
    a securing element which attaches onto the line end and the connecting piece and holds the line end in the connecting position, wherein one of the connecting piece and the line end comprises a locking element that locks the one of the connecting piece and the line end under prestress with the securing element in conjunction with a mating locking element on a securing element, wherein the locking element comprises a locking rib projecting away from the connecting piece in a projection-like or a blade-like manner and which extends through a locking opening on the securing element in such a manner that the locking element on an opening-edge side of the locking opening locks with a mating locking element on the locking-rib under prestress in a direction of the locked position, and
    wherein the the locking rib extends through the locking opening such that the opening edge side of the locking opening locks into a recess on a locking-rib side under prestress in the direction of the locked position.

2. The water-conducting household appliance of claim 1, wherein the securing element is connected to the line end and/or to the connecting piece with a releasable locking connection.

3. The water-conducting household appliance of claim 1, wherein the securing element comprises one piece and/or a uniform material.

4. The water-conducting household appliance of claim 1, wherein the securing element comprises a plastic material.

5. The water-conducting household appliance of claim 1, wherein the line end is inserted along a predetermined insertion length into a mouth area of the connecting piece.

6. The water-conducting household appliance of claim 5, wherein the line end is inserted in a sealed manner using a sealing element, and the line end is supported on a valve element embodied in the connecting piece.

7. The water-conducting household appliance of claim 5, wherein the connecting piece comprises a bevel as a lead-in chamfer in the immediate mouth region.

8. The water-conducting household appliance of claim 5 wherein the line end comprises a diameter reduction.

9. The water-conducting household appliance of claim 1, wherein the securing element embraces the connecting piece and/or the line end in a predetermined region in a substantially form-locking manner and lies against an outer circumferential surface of the connecting piece and/or of the line end in a contact connection.

10. The water-conducting household appliance of claim 9, wherein the securing element comprises a half shell and/or a securing bracket which can be clipped on elastically, which embraces the line end and/or the connecting piece in a predetermined region.

11. The water-conducting household appliance of claim 10, wherein the securing bracket comprises a half shell and has projection-like clamping webs spaced at a distance from one another on a shell base body associated with a cylindrical connecting piece in a transverse radial direction, wherein clamping webs form an embracing angle range which exceeds 180° of the securing element.

12. The water-conducting household appliance of claim 9, wherein the securing element comprises an embracing angle on a line-end side and/or connecting-piece side of greater than 180°.

13. The water-conducting household appliance of claim 9, wherein the securing element comprises an embracing angle on a line-end side and/or connecting-piece side of greater than 200°.

14. The water-conducting household appliance of claim 9, wherein the securing element comprises an embracing angle on a line-end side and/or connecting-piece side of 200° to 300°.

15. The water-conducting household appliance of claim 1, wherein the prestress is formed by a force accumulator acting in a direction of the seal seat and/or locked position by an elastic line region having a wave profile, and/or by an elastic seal between the line end and an abutment associated with the line end and/or a valve element in an elastically resilient manner, which works in conjunction with the securing element such that the line region, in the fitting of the securing element, can be displaced or compressed in connection with an abutment on the connecting-piece side, building up a prestress, whereby, after the securing element has been fitted, the prestress is at least partially relaxed such that the line end is pulled in the direction of the seal seat on the connecting piece and/or the locking element on the securing-element locks with the locking element on the connecting-piece and/or line-end.

16. The water-conducting household appliance of claim 15, wherein a gap between the locking element on the connecting-piece and on the line-end is predetermined such that, when the securing element is fitted and mating locking elements on the securing-element are correspondingly locked with the locking elements, a prestressing force is effected by means of the application of force to the line end by means of its support against an abutment on the connecting-piece, which prestressing force forces the hose end in the direction of the connecting piece and/or locks the securing element with the connecting piece and/or the line end.

17. The water-conducting household appliance of claim 1, wherein the locking element pulls the line end into a prestressed seal seat with the connecting piece in conjunction with the mating locking element on the securing-element.

18. The water-conducting household appliance of claim 1, wherein the securing element comprises a projection-like locking web or locking collar that can be locked as a mating locking element in a substantially force-locking and/or form-locking manner with or in a locking groove on the line-end or at least partially embraces the locking groove on the line-end such that a locking collar having a bevel is clipped as a mating locking element onto a region of the line having the locking groove.

19. The water-conducting household appliance of claim 1, wherein the water-conducting line comprises a flexible hose line with a region having a wave profile.

20. The water-conducting household appliance of claim 1, wherein the water-conducting line comprises a pump discharge hose which is connected to a connecting piece of a pump sump which can be connected to a pump.

21. A method for fitting a securing element on a connection of a connecting piece to a line end of a water-conducting line of a water-conducting household appliance, the method comprising clipping the securing element on to the connecting piece and the line end in a releasable manner, wherein a locking connection between the securing element and the connecting piece and a locking connection between the line end and the securing element have such a defined gap between them that the line end, when the securing element is clipped on to the connecting piece, is pulled in the direction of a seal seat on the connecting piece and/or the securing element under prestress, locks in a releasable manner with a locking element on the connecting-piece, and an opening edge of a locking opening on the securing element surrounding a locking rib on the connecting-piece and locking into a locking recess on the locking-rib.

* * * * *